Fred W. James
INVENTOR.

BY Arnold and Roylance
ATTORNEYS

Fig. 14

Fred W. James
INVENTOR.

BY Arnold and Roylance
ATTORNEYS

United States Patent Office 3,436,860
Patented Apr. 8, 1969

3,436,860
DOOR HINGE AND LATCH MECHANISM
Fred W. James, Beauxart Garden, Tex.
(Rte. 4, Box 139-B, Beaumont, Tex. 77705)
Filed Mar. 21, 1966, Ser. No. 535,901
Int. Cl. E05d *15/52*
U.S. Cl. 49—192            18 Claims

ABSTRACT OF THE DISCLOSURE

A hinge-and-latch mechanism is provided which includes a hinge mounted on one side to either a door or door jamb, and the other side of which contains a latch mechanism which is suitable for releasable engagement with the other of the door or door jamb. The hinge and latch structure provided includes a lock pin arrangement whereby the door may be opened at either side, as desired, or may alternatively be opened at both sides simultaneously. Such lock pin prevents separation of the latch from the hinge when the door is in door-open position, but permits free release of the latch from the spring when the door is in door-closed position. A latch mechanism is provided which includes detent means such as a resilient spring operable to both releasably engage a pin member and also to hold the latch mechanism together. In various embodiments, different arrangements of the latch mechanism are provided, one such arrangement allowing for adjustment of a portion of the latch mechanism along the line of pin movement.

---

This invention relates to a door-hinge-latch mechanism which is especially suitable for use on closures which may be selectively opened from either side or at both sides simultaneously. In a subcombination embodiment, the invention relates to a particularly desirable pin-and-bushing-type latch mechanism suitable for use in a multitude of environments.

The invention provides a double-hung door assembly which may be opened selectively from either side, or may be opened from both sides simultaneously. The invention relates to such an assembly whereby hinges are mounted to one of a door or door jamb, and are operable with a latch mechanism mounted to the other of the door or door jamb. Releasable catch means are provided whereby the latch mechanism is securely engaged with the hinge when the hinge is in door-open position, but whereby the latch mechanism allows free release of the door when the hinge is in door-closed position.

In other embodiments, the invention provides various hinge and latch mechanisms of the above type.

In other embodiments, the invention provides latch mechanisms for securing a first member to a second member. Such mechanisms may include a bushing mounted on a mounting plate, with resilient means which function both (1) as a detent means to releasably engage a pin member, and (2) to hold the assembly together. In one embodiment, the invention provides such an assembly whereby the position of the bushing can be adjusted along the line of pin travel.

Certain preferred embodiments of the invention have been illustrated in the accompanying drawings, which form a part of the specification and wherein.

Figure 8:
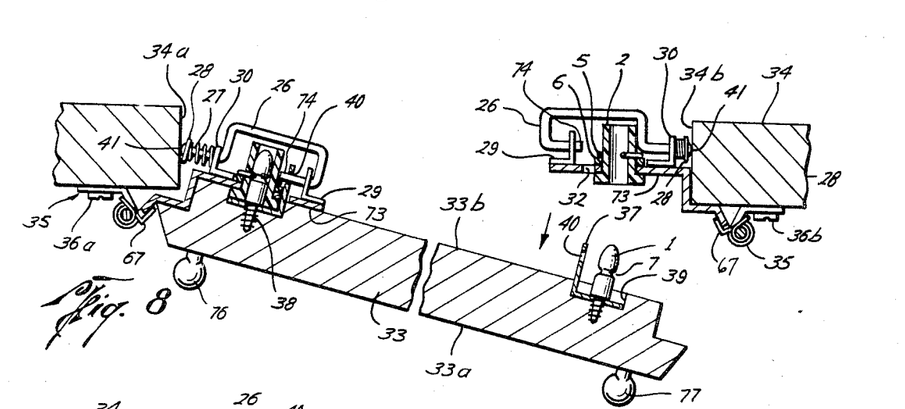
FIGURE 8 is a plan view of a double-hinged door illustrating a hinge and latch mechanism constructed in accordance with one particularly desirable embodiment of the invention, and illustrating the door in an open position.
Figure 9:
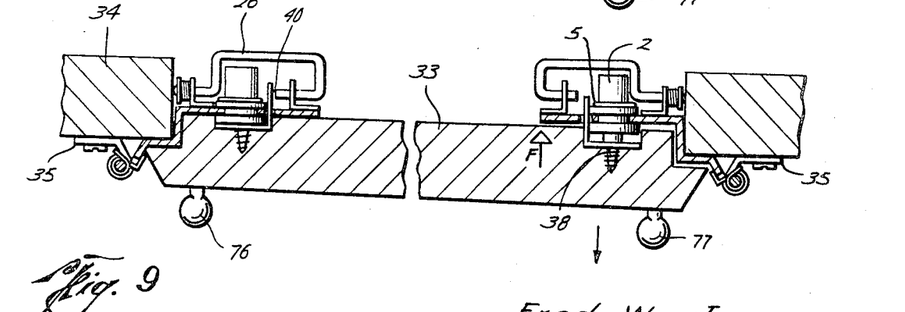
FIGURE 9 is a view similar to FIG. 8, but showing the door in the closed position, upon actuation toward opening.
Figure 10:
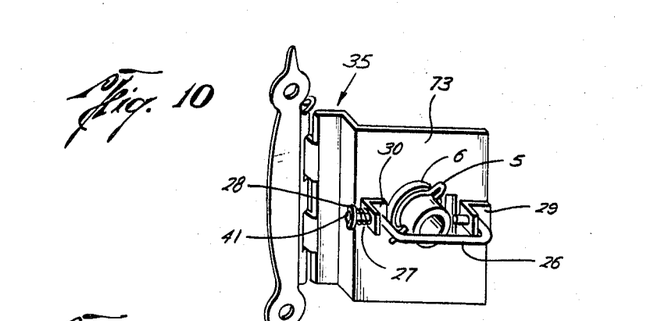
FIGURE 10 is a pictorial view of a hinge such as shown in FIG. 8, having thereon a latch mechanism in accordance with one embodiment of the invention.

*The embodiments of FIGURES 8, 9 and 10*

Figure 4:
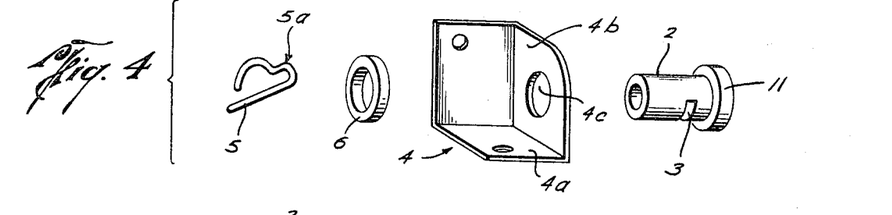
FIGURE 4 is a pictorial view of various component parts of the mechanism illustrated in FIGS. 1–3.
Figure 5:
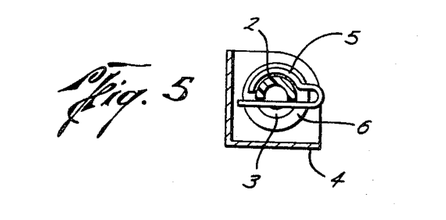
FIGURE 5 is a view taken along the line 5—5 of FIG. 2.

Referring now in more detail to the above drawings, it is seen that a particularly preferred door-hinge-latch mechanism is illustrated in FIGURES 8, 9 and 10, some parts of which are also illustrated in FIGURE 4. It is readily seen that the invention in this context provides for a closure means such as the door 33 to be double-hung between a pair of fixed members, such as the door jambs 34a and 34b. That is, the door 33 may be opened from either side or from both sides simultaneously for total removal. The door 33 is seen to define an outer surface 33a to which any convenient handle means such as door knobs 76 and 77 might be secured, and an inner surface 33b.

In accordance with this embodiment of the invention, at least one hinge-and-latch mechanism is mounted at each of two opposite sides of the door 33 on the inner surface thereof, whereby a pull on the door at either side will cause the door to open on that side while pivoting about the hinge-and-latch mechanism at the opposite side. A pull on both sides simultaneously will cause the door to be released from each hinge-and-latch mechanism, thus resulting in removal of the door from the door jambs.

The hinge-and-latch mechanisms on each side of the door may conveniently be the same, and may take one of the forms illustrated in FIGURES 8–15 or as defined in the appended claims.

In the FIGS. 8–10 embodiment, one end of each hinge 35 (which may desirably be conventional hinges) is shown to be secured to one of the door jambs 34a and 34b by fastening means such as the screws 36a and 36b. The free end 73 of each hinge carries one part of a frictional releasable engagement means, sometimes herein referred to as the frictional latch, or detent means and a releasable positive-catch means.

The frictional releasable engagement means may take various forms, of which one form is shown in FIGURE 8 where such means comprises a male member and a female member. The female member is here shown to take the form of an elongated generally tubular-shaped bushing 2 (see FIG. 4) having at one end thereof a radially outwardly extending abutment means.

In this embodiment abutment means such as the flange 11 engage the hinge and a mounting plate 73 and limits movement of the bushing in a direction away from the door 33. Of course, such a bushing may be conveniently constructed of any suitable material, such as a synthetic polymeric material, for instance polyethylene or nylon, and, in any event, is preferably of generally hollow configuration. The female member of the frictional releasable engagement means is here shown to be mounted on the hinge. However, it is noted that a reversal of parts arrangement whereby the male member is mounted on the hinge is satisfactory in some instances.

In the FIGURE 8 arrangement the bushing 2 is limited in movement in a direction toward the door 33 by a resilient member snapped thereon, such as the D-spring 5. This resilient member conveniently fits into a thin transverse slot 3 (see also FIG. 4) which extends through the bushing. Such a slot many extend approximately one-third of the distance around the bushing, and is more clearly viewed in the FIGURE 4 representation of the bushing. The resilient member 5 has sufficient structure such as the loop 5a to prevent movement of the elongate portion of the bushing through the hinge.

Between the D-spring 5 and the flange 11 of the bushing, there may be positioned one or more washers 6, cooperating with the spring 5 to limit movement of the bushing toward the door 33. Alternatively one or more washers may be located between the bushing flange 11 and the hinge portion 73. The inclusion of such one or more washers serves an additional purpose; namely, it allows positional adjustment of the female bushing 2 with respect to the hinge plate 73, along the line of movement of the male member. Further, in many embodiments, the washer performs the additional function of providing linear stabilization of the bushing assembly.

The male member of the frictional releasable engagement means may conveniently be mounted on the door 33 in a position to ensure mating with the female member, and may take the form of the pin 1 which is here illustrated to be of generally circular cross section and of generally cylindrical overall shape, having a groove 7 extending completely around the outer surface of the pin 1 generally concentric with the longitudinal axis of the pin 1. This groove 7 is conveniently located about mid-way along the length of the pin 1 for reasons which will be apparent from the description which follows. The pin 1 is desirably tapered at one end thereof to facilitate insertion into the mating bushing assembly. It may be constructed of any suitable material such as hard steel, and secured to the door as by threads 38.

The resilient member such as the D-spring 5, which fits into the slot 3 in the bushing 2, is adapted for frictional engagement with the pin 1. It will be readily understood that, when the pin part is moved toward the bushing part, the pin enters the hollow in bushing 2, tapered part first, and the spring 5 engages the outer surface of the pin. The tapered surface of the pin 1 opens the resilient spring 5, and then further movement of the pin 1 into the bushing 2 tensions the spring 5 until it snaps into engagement with the pin 1 at the groove 7. An outwardly exerted force is then necessary to release the pin 1 from the bushing 2.

It is thus seen that the spring 5 serves simultaneously both to hold the parts of the female portion of the latch mechanism in assembly and to provide the frictional engagement force for releasably engaging the male member of the latch mechanism.

It will be understood that a pull on either side of the door 33, will disengage the frictional releasable engagement means or latch comprising pin 1 and bushing 2, to permit opening of that side while the door pivots upon the hinge at the other side. To prevent inadvertent release of a frictional latch during pivoting on the associated hinge, releasable positive-catch means may also be provided in association with the pin-and-bushing frictional latch.

As shown in the FIGURES 8–10 embodiment, this releasable positive-catch means may take the form of a somewhat hook-shaped lock pin 26 and a lock clip 37, which are adapted to interlock upon pivoting of the mechanism. In this embodiment, the lock clip 37 is L-shaped, the base being generally parallel to the inner surface 33b of the door, and the perpendicular upwardly extending portion being of a height approximately the same as the height of the pin 1. The base of the L-shaped lock clip 37 is conveniently placed in a recess 39 in the inner face of the door, the recess being adapted to receive the bushing flange 11. The lock-clip 37 is held in place by the pin 1, which is mounted therethrough in the manner illustrated in FIGURE 8. Near the top of the upwardly extending portion of the lock clip 37 is a hole 40 of a size sufficient to allow an end 74 of lock pin 26 to pass therethrough, for positive-catch of door to hinge whenever the hinge plate 73 is in open position as at the left of FIGURE 8.

The hook-shaped lock pin 26 is mounted on the hinge plate 73 and is free for reciprocal movement generally perpendicular to the pin 1 and elongated bushing 2, such movement being determined by the position of the hinge plate 73 relative to the door jamb 34a or 34b. The lock pin may be conveniently mounted on the hinge plate 73 by means of a pair of L-shaped lugs 29 and 30, the lugs being mounted in generally parallel relationship one on each side of the bushing 2, and each of the lugs containing a hole of a size adapted to receive the lock pin 26.

Means are provided by which the lock pin 26 is resiliently urged in the direction to bring its end 74 into the hole 40 of the lock clip 37 for positive catching as at the left side of FIGURE 8, while yielding to actuation by the associated door jamb 34a or 34b to disengage the end 74 from the hole 40, as in FIGURE 9. Such means may take the form of a spring or other resilient member 27 mounted around the end-portion 41 of the lock pin 26, between a ring 28 thereon and the lug 30. The very end 41 of the lock pin 26 is positioned to engage the jamb 34a or 34b, thereby to compress the spring 27 when the hinge plate 73 is in fully closed position, for release of the positive catch in hole 40.

One effect of the spring 27 is to urge the hinge plate 73 from the fully closed position of FIGURE 9, to the partially open position at the left of FIGURE 8. Accordingly, means may conveniently be provided to resiliently urge the hinge plate 73 to the fully closed position, as at the right of FIGURE 8, both to hold the female portion of the frictional latch in position to receive the male pin 1, and when desired to afford to the door 33 proper a bias toward the closed position. These composite functions may be effected by a further spring 67 operating on the two halves of the hinge 35 to resiliently urge the hinge plate 73 to closed position, if desired with a force stronger than the counter-force of spring 27.

In opening the door of FIGURE 8, pulling on the door knob 77 at the right, causes the door to swing on the hinges at the left. At first when the right hand portion of the door is pulled outwardly, the swinging portion 73 of the hinge tends to come out with the pin 1. But this results in engagement between the hinge edge and the abutting surface of the door whereby a sort of prying action occurs (at F in FIG. 9) pulling the pin 1 free of the D-spring 5 in the bushing 2, whereby the door pivots on the hinges at the left, opening on the right. When the door is thus opened, the end 74 of the lock pin 26 opposite the door jamb is seen (left of FIG. 8) to pass through the hole 40 in lock clip 37, thus preventing the door from opening at or falling from that pivoting mechanism.

Just after release of the pin 1 from the hinge plate 73 and bushing 2 at the right, (see FIG. 8) such hinge and bushing return to the pin-receiving position, as illustrated at the right-hand side of FIGURE 8, under the force of hinge-spring 67. Thus, when that side of the door 33 is propelled toward the hinge and bushing, as by a simple push, the tapered end of the pin 1 passes into the hollow of the bushing 2 until the D-ring snaps around the groove 7 in the pin. The pin and bushing mechanism is then interlocked until the door is once again pulled outwardly at that side.

Figure 11:
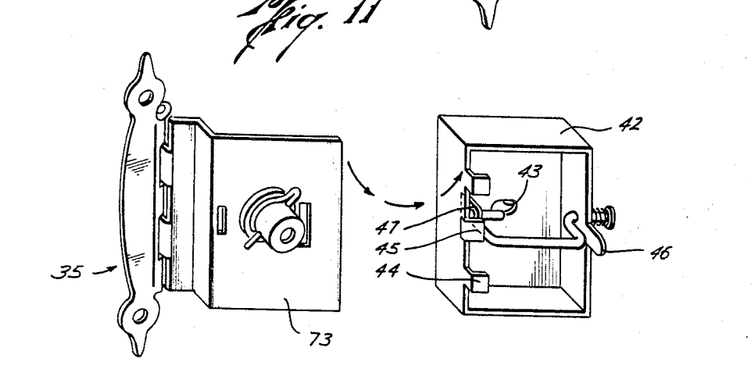
FIGURE 11 is a pictorial view of a hinge and mounting cover containing a latch mechanism constructed in accordance with another embodiment of the invention.
Figure 12:
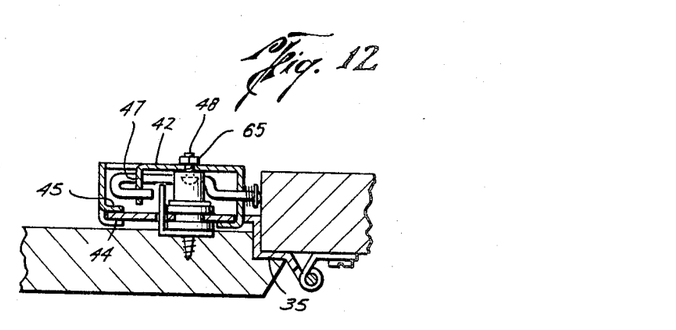
FIGURE 12 is a view similar to a portion of FIGS. 8 and 9, but illustrating a latch mechanism constructed in accordance with the FIG. 11 embodiment.

The embodiment of FIGURES 11 and 12

In FIGURES 11 and 12 is illustrated another embodiment of the invention. Here, each hinge and bushing is covered by housing means, which may conveniently take the form of the cover 42. Here, the cover is conveniently fastened to the hinge plate 73, being attached in this embodiment by the prongs 44, 45, some of which are longer than others so that they may be attached on opposite sides of the hinge, and by the prong 46. The cover conveniently includes in the top portion thereof an oblong hole 43 for receipt of a bolt 48. Bushing 2 in this embodiment has a "bottom" with a hole therein and is conveniently mounted to the cover by means of this bolt 48 passing through the bushing "bottom" and housing and secured by a nut 65. Here, the function of the lug 30 is well served by a hole in the side of the cover adjacent the door jamb, and the function of the lug 29 is well served by the lug 47 conveniently stamped out of the top of the cover.

This embodiment eliminates the need for the two lugs 29 and 30 of the FIG. 8 embodiments, and the need for soldering, welding or screwing them into place, substituting the easily mass-produced sheet-metal stamping, the housing 42. Further, since the bushing 2 is in this embodiment positioned by the housing and bolt 48 (or a screw in other embodiments), the washer 6 and bushing flange 11 can if desired be eliminated, thereby affording a more simple manufacturing and assembling technique.

Figure 13:
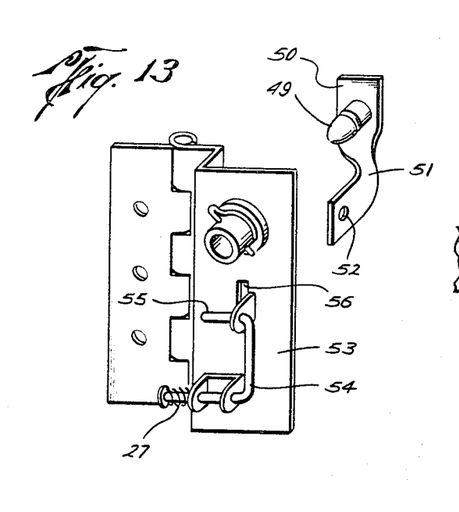
FIGURE 13 is a pictorial view of a hinge having affixed thereto a latch mechanism constructed in accordance with still another embodiment of this invention.

The embodiment of FIGURE 13

In the FIGURE 13 embodiment the parts are seen to be of different construction, and the lock clip and pin are seen to be constructed as a single piece. The pin part is constructed in this embodiment with a base 50, a pin 49 protruding from that base, and an extended portion of the base twisted so that it extends outwardly in a direction parallel to the pin 49. The extended portion constitutes a lock clip portion 51 with a positive-catch hole 52 therein. Any conventional means may be used to secure lock clip and pin to the door.

In this embodiment, the lock pin is again of different construction. Here, the lock pin 54 is roughly U-shaped and has an end 55 opposite the spring 27. Adjacent the lock pin 54 near its end 55 is an elongated slot 56 in the hinge plate 53, through which the extended portion of the pin assembly is adapted to pass. It is thus readily seen that the end 55 of the lock pin may be engaged in the opening 52 of the extended portion in the very general manner of the FIGS. 8–12 embodiments.

Figure 14:
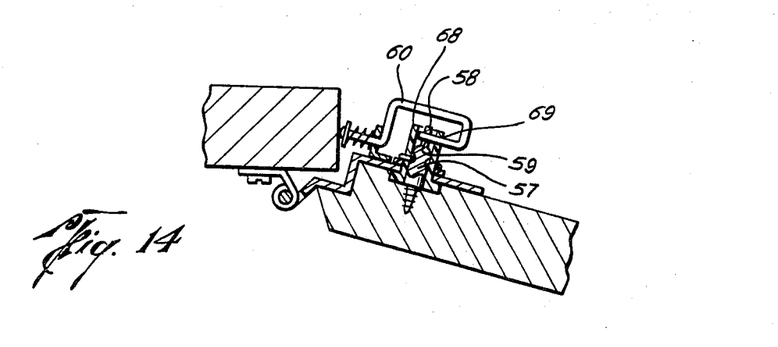
FIGURE 14 is a view similar to FIG. 12, illustrating another preferred embodiment of the invention.

The embodiment of FIGURE 14

Still another embodiment of the invention is illustrated in FIGURE 14. The FIGURE 14 embodiment is similar to the FIGURE 8 embodiment in many respects, but note that the positive-catch function is effected in a novel manner. That is, the frictionally engaging pin 57 of this embodiment has at the end opposite its base an extended portion 58, which extended portion has a hole 59 therein.

In the nonflanged end portion of the bushing 68 is a catch means in the form of a hole 69, this hole being aligned with the hole 59 in the pin 57 in a manner suitable for the lock pin 60 to fit through both holes at the same time and whereby the end of the lock pin opposite the spring rides in the bushing. Otherwise, this embodiment functions in the same general manner as the FIGURE 8 embodiment.

Figure 15:
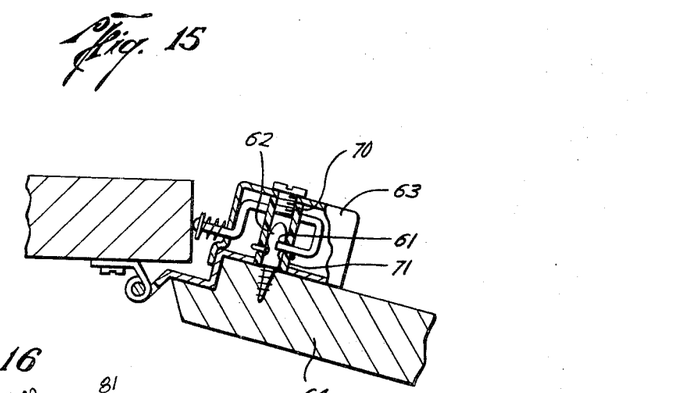
FIGURE 15 is also a view similar to FIG. 12, and illustrates yet another preferred embodiment of the invention.

The embodiment of FIGURE 15

FIGURE 15 shows still another embodiment wherein a different bushing construction is employed. In this embodiment, the end of the lock pin fits into a notch 61 located in the pin 62. The lugs 29 and 30 of the FIGS. 8–10 embodiment are eliminated, and the bushing 70 has a flanged portion 71 offset from the end of the bushing. The cover may be attached to the bushing in the FIG. 12 manner. It is seen that this embodiment requires tion of upper attached thereto forwardly of the heel area, ment the cover and its lugs or other securing means serve to hold the bushing assembly and hinge plate together.

Figure 16:
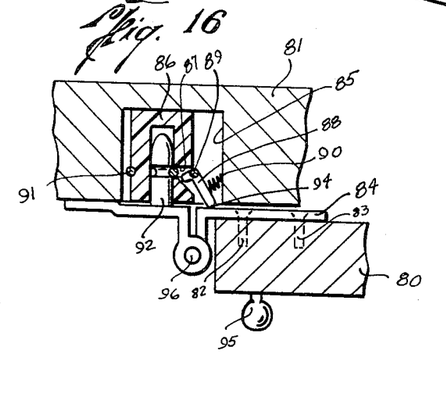
FIGURE 16 is also a view similar to FIG. 12, and illustrates yet another preferred embodiment of the invention.

The embodiment of FIGURE 16

The invention has thus far been described with relation to double-hung doors or other closures. It is of course also useful for double-hung mounts of other types, such as signs. Also, the above description has been directed toward use of the hinge-and-latch mechanism with one part of the latch mechanism on the hinge and the other part of the latch mechanism on the door. A reversal of parts arrangement whereby one part of the latch mechaarea, said heel section being detachable attached to said in some instances.

These features are illustrated in FIGURE 16, wherein a mount 80 is hingedly mounted to a backing 81. The mount 80 could be, for instance, a sign which is mounted as illustrated in FIGURE 16 on each of two sides to a continuous backing member so that one side of the sign could be removed for work on the back side of the sign while the other side of the sign remained pivotally hinged to the backing member.

In this embodiment, the hinge 84 is secured, as by socket, and a section of material connected with said sole and in contact with a part of said heel section and opposing the sliding of said heel section out of its position of attachment to said socket, said opposing section of material the screws 82 and 83, to the mount 80 but is not secured to the backing member 81. Recess or bore 85 in the backing member is of a size sufficient for containing therein a pin-bushing-spring and catch mechanism such as that illustrated in this embodiment. The bushing 86 is adapted to receive a hinge-mounted pin 92, and is mounted in the bore 85 in any convenient manner, as by use of an adhesive. The bushing contains a slot 87 of a size suitable for receiving a D-spring 91 such as that described above and positive-catch means. Such positive-catch means are here shown to comprise an L-shaped member 88 pivotally mounted on the pivot pin 89 which is secured to the backing member. Means such as the spring 90 urges the L-shaped member toward the slot 87 to about the D-spring 91 to thereby prevent the bushing and spring from releasing the pin 92. But the end 94 of the L-shaped member is generally in abutment with the hinge 84 and cannot act to lock the D-spring in place.

It can be readily seen that when the mount 80 is pulled away from the backing member 81 by pulling on the knob 95, the pin 92 will be readily released from the bushing and spring and the mount will be removed at that side. But a pull on the knob at the other side (not shown) causes the mount to swing out about the point 96, whereupon the end 94 of the L-shaped catch is no longer in engagement with the surface of the hinge 84. The catch is thus urged by the spring 90 into the slot 87, thus locking the pin 92 in the spring and bushing.

While the invention has found particular utility in connection with double hung doors or mounts, it is also useful in simpler environments. For example, reference is made to FIGS. 1-5 for one such embodiment, and FIGURES 6 and 7 for two others.

The embodiment of FIGURES 1-5

Figure 1:
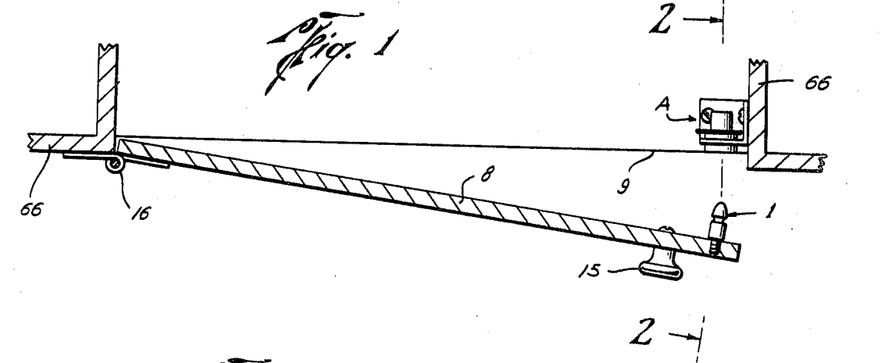
FIGURE 1 is a plan view of a hinged door and shelf having affixed thereto a latch mechanism of the pin-and-bushing-type constructed in accordance with one embodiment of this invention.

In FIGURE 1, there is shown a closure such as the door 8 positioned in the door opening of a cabinet 66, having therein one or more shelves 9. The door may be connected by any suitable means, such as the hinge 16, to one end of the cabinet. At the end of the door opposite the hinge 16 there is seen to be handle means such as the knob 15 on the outer surface of the door. On the inner surface of the door at this end is an inwardly facing male member such as the pin 1. This male member is adapted to mate with a female member, such as the bushing assembly A, that is mounted at the door opening side of the shelf 9.

Figures 2, 3:
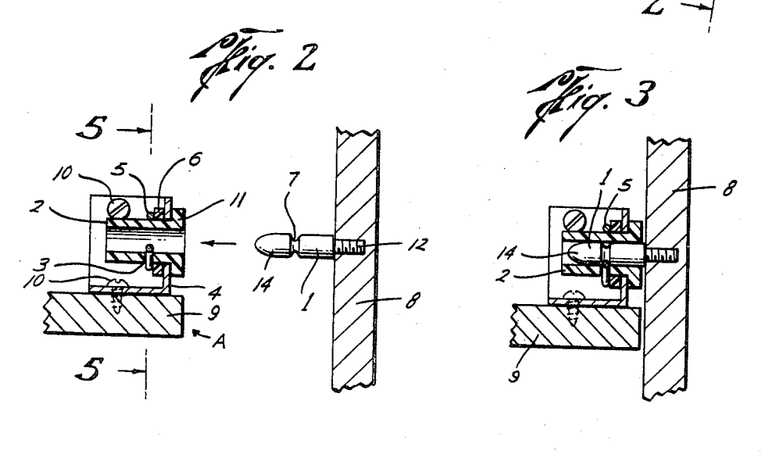
FIGURE 2 is a view taken along the line 2—2 of FIG. 1, showing the separate parts of the latch mechanism in an open position.
FIGURE 3 is a view similar to FIG. 2, but showing the latch mechanism of the FIG. 1 embodiment in the closed position.

The particular pin and bushing assembly of this embodiment is more clearly viewed in FIGURES 2-4. Here, it is clear that the pin 1 has been mounted in the door 8 by means of the threads 12 at the base of the pin. It is also seen that the pin is generally perpendicular to both the length and the face of the door. The pin 1 is conveniently similar in structure to the pin 1 of the FIGURE 8 embodiment described above.

The bushing assembly A may be affixed to the shelf 9 or the cabinet 66 in any convenient manner, as by the screws 10 in the mounting plate 4 to the shelf and cabinet. Of course, this assembly need not be mounted to both shelf and cabinet, but could be mounted to either with satisfactory results. The particular bushing 2 illustrated in FIGURES 1-5 is also similar to the bushing embodiment disclosed in FIGURE 8. Similarly, the D-spring 5, as best shown in FIG. 4, is also similar to the D-spring of the FIG. 8 embodiment, though it is emphasized that many different structural embodiments of such a spring are useful.

The bushing assembly is seen to be mounted by means of the mounting plate 4. Here again many various types and configurations of such plates such as a simple L-bracket may be used, the particular plate illustrated in FIGURE 2 being more clearly shown in FIGURE 4 as having a bottom portion 4a for positioning on the top of shelf 9 and an end portion 4b perpendicular thereto. The end portion 4b has a hole 4c therein through which the major portion of the bushing is adapted to pass. Such a configuration is especially convenient since the flange 11 of the bushing fits securely around the aperture 4c to facilitate positioning of the bushing in the mounting plate. A resilient spacer such as the washer 6 is desirably mounted on the side of the end wall 4b opposite the flange 11. Such a washer is also clearly viewed in FIGURE 4.

Arrangement of the washer in this manner, as pointed out above in connection with the FIGURE 8 embodiment, allows for distinctly advantageous versatility of this embodiment in that it allows for easy positional adjustment along the line of pin movement. For example, positional arrangement must be altered because of a warped cabinet door or the like, the washer may be simply moved to the other side of the mounting plate.

It is noted that, when the door is in the FIGURE 3 position, the latch mechanism serves as additional support for the door.

Figure 6:
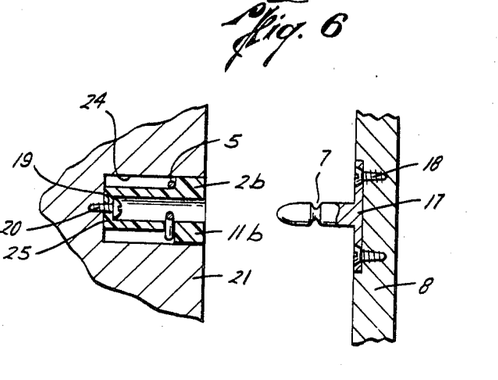
FIGURE 6 is a view similar to FIG. 2, but illustrating another embodiment of the invention wherein the pin and bushing parts of the latch mechanism are attached to a door and facing in a manner different from the FIGS. 1–5 embodiments.

The embodiment of FIGURE 6

FIGURE 6 is illustrative of another different way this pin and bushing latch mechanism may be mounted. In FIGURE 6 the portion of the pin adapted for mounting to a door or the like takes the form of a base 17 perpendicular to the length of the pin. The base has at its outer ends a couple of openings adapted to receive screws 18 for securing the pin to the door 8.

Different embodiments of the bushing and bushing assembly are also illustrated tin FIGURE 6. Here, instead of external mounting on a shelf or door facing 21, the bushing 2b is mounted therein, the flanged end 11b of the bushing being mounted flush with the external surface of the facing 21.

It is readily seen that in this embodiment, a bore 24 is drilled in the facing 21, the diameter of this bore being generally equal to the diameter of the flanged portion 11b of the bushing. Instead of being open at the end opposite the flange 11b, as was the bushing of the FIGURES 1-5 embodiment, the bushing 2b has an end portion 25 percenter of this end portion is an opening 19 through which fits a screw 20 to affix the bushing to the facing 21. It may be desired to construct the bushing 2b witah a slightly longer flanged portion 11b than the corresponding portion of the bushing of the FIGS. 1-5 embodiment, in order that the bushing will have greater stability in the bore 24.

Figure 7:
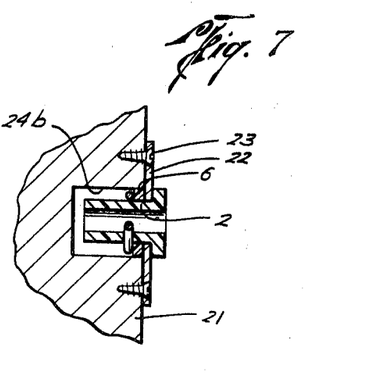
FIGURE 7 is also a view similar to FIG. 2, but illustrating still another embodiment of the bushing assembly and its manner of installation.

The embodiment of FIGURE 7

In the FIGURE 7 embodiment, the bushing 2 may be constructed just as in the FIGS. 1-5 embodiment, and yet may be internally mounted. Here the bushing 2 fits into the bore 24b and is secured thereto by means of an annular mounting plate 22 which is attached to the facing 21 by means of the screws 23. It is recognized that while internal mounting is provided in the FIG. 7 embodiment just as in the FIGURE 6 embodiment, the length of the bushing and related parts are much less, thereby allowing use of the FIGURE 7 embodiment in relatively thin walls. Of course, the FIGURE 6 embodiment has the advantage of perfectly flush mounting. In both the FIG. 6 and the FIG. 7 embodiments, the bushing assemblies are semi-concealed.

It is noted that is the FIGURES 6 and 7 embodiments, the D-spring is constructed without the looped portion 5a in order to facilitate insertion of the bushing assembly into the bore. The bushing and mounting plate may when desired be made as an integral assembly, eliminating the need for the washer 6. Of course, this embodiment suffers from the disadvantage that the positional adjustment along the line of pin movement is not provided.

It is also possible to mount the bushing assembly in a thin wall, for example ⅛ inch in thickness, with the bushing assembly extending through the wall.

It is readily seen that a latch mechanism and hinge-and-latch mechanism are provided which may be used in many and varied environments, including conventional hinges of almost any type, and on the plain surfaces of doors, shelves, door jambs and facings. The latch mechanism provided is conveniently mounted to present flush surfaces or nearly flush surfaces as desired, as by embedding the parts into the surfaces, and the mechanism may be semi-concealed. The male member may be located in a shelf sticking outward, and the female member firmly secured to the door or other closure so that the female member moves with the closure. Further, either male or female member or both, may be corner-mounted. Thus, great flexibility of mounting is achieved with the latch mechanism here provided.

Besides cabinet or closet doors, the latch mechanism of this invention is also conveniently used on other types of closures or mounts for a great variety of other uses, for example appliance inspection plates or detachable signs or the like.

It is further seen that the invention provides a latch mechanism which is snap-acting, simple, and quiet in operation, of simple design and economy of construction.

Further, a mechanism is provided wherein the position of the bushing along the line of pin movement may be readily adjusted.

Of special significance is the fact that a latch mechanism of the above character is provided wherein no release mechanism is necessary for opening a closure to which the latch mechanism is secured.

While the invention has provided an improved latch mechanism having the above advantages, it has also provided for the first time a simple and convenient means for providing double-hung doors, for example cabinet doors, wherein the door may be operated by a frictionally released latch employing no release mechanism. And, quite significantly, a double-hung door is provided which, when opened from one side, will automatically lock to the hinge on the other side.

Still further, it is seen that a latch mechanism has been provided which, in some embodiments, will support a door when the door is in a closed position. And in some embodiments, the invention provides a latch mechanism of the pin-and-bushing-type having releasable catch means, where at least part of the releasable catch means rides in the bushing.

While the invention has been described in terms of various embodiments, it will be obvious to those skilled in the art that various changes and modifications may be made in the illustrative structures described without departing from the scope of the invention.

I claim:

1. A double-hung door assembly which may be selectively opened from either side or at both sides simultaneously comprising:
    a door suitable for mounting between a pair of door jambs whereby each of two opposite sides of said door cooperates with one of said door jambs;
    mounted on each of said door jambs at least one hinge with one end thereof secured to the door jamb and one end thereof free for pivotal movement;
    resilient means urging each said hinge to door-closed position;
    in operative relationship with each hinge end which is free for pivotal movement, a latch mechanism adapted at times to join said hinge to said door and at times not to join said hinge to said door, said latch mechanism comprising
        a pin mounted upon said door,
        a bushing adapted to releasably receive said pin therein, said bushing having a slot therein and an abutment at one end thereof,
            said bushing being mounted on the movable end of said hinge with said abutment operative to limit movement of said bushing relative to said hinge in one direction and with said slot on the opposite side of said hinge from the abutment,
    a resilient spring at least partially surrounding said bushing and having a portion thereof in said slot and operative both to hold said bushing, spring and hinge together and simultaneously to releasably engage said pin,
    an abutment surface operatively associated with said door,
    a lock pin carried upon said hinge and resiliently urged into contact with said door jamb at one end and adapted at the other end to engage said abutment surface when the hinge is in door-open position thereby to provide a positive securing of door to hinge, but inoperative when the hinge is in door-closed position thereby to permit easy release of said pin from said bushing upon the simple application of appropriate force;
    all whereby upon simultaneous application of appropriate force the latch mechanism on both sides of the door release in response solely to such force, and upon application of appropriate force at one latch mechanism such latch mechanism releases permitting the door to swing open while the latch mechanism on the opposite side of the door becomes positively engaged until the door is once again closed.

2. A double-hung door assembly which may be selectively opened from either side or at both sides simultaneously comprising:
    a door suitable for mounting between a pair of door jambs, whereby each of two opposite sides of said door cooperates with one of said door jambs;
    at least one hinge mounted on each of said door jambs, whereby one end of said hinge is adjacent the inner surface of said door and is free for swinging movement; and,
    at least one latch mechanism adapted at times to join said hinge to said door and at times not to join said hinge to said door, said latch mechanism comprising
        a generally hollow bushing having a flanged portion at one end thereof, said bushing being mounted on said hinge in such a manner that said flanged portion is positioned on the side of the hinge opposite the remainder of the bushing, and said bushing further including a slot extending therethrough on the side of the hinge opposite said flanged portion,
        a resilient spring member in said slot,
        a generally cylindrical pin member adapted to fit into said bushing and to become frictionally engaged by said spring member, whereupon said hinge is joined to said door, and
        releasable positive-catch means in operative relationship with each hinge and associated frictional releasable engagement means,
            the releasable positive-catch means upon the pivoting of the associated hinge to door-open position being operative positively to secure the associated frictional releasable engagement means against release, and upon the pivoting of the associated hinge to door-closed position being inoperative, whereby said frictional releasable engagement means may be released by the simple application of appropriate force.

3. A double-hung door assembly of claim 2, wherein said releasable positive-catch mechanism comprises:
    lock clip means having a hole therein and mounted on one of said hinge or said door, and
    a generally hook-shaped lock pin one end of which is adapted to fit through said hole in said lock clip means and mounted on the other of said hinge or said door, whereupon passage of said lock pin through the hole in said lock clip means prevents separation of said hinge from said door.

4. A double-hung door assembly which may be selectively opened from either side or at both sides simultaneously comprising:
    a door suitable for mounting between a pair of door jambs, whereby each of two opposite sides of said door cooperates with one of said door jambs;
    at least one hinge mounted on each of said door jambs, whereby one end of each hinge is secured to its respective door jamb and one end is adjacent the inner surface of said door and is free for swinging movement; and,
    at least one latch mechanism mounted partly on the free end of each of said hinges and partly on the adjacent surface of the door on each of said opposite sides, said latch mechanism comprising
        frictional releasable engagement means adapted at times to join said hinge to said door and at times not to join said hinge to said door,
        releasable positive-catch means in operative relationship with each hinge and associated frictional releasable engagement means,
            the releasable positive-catch means upon the pivoting of the associated hinge to door-open position being operative positively to secure the associated frictional releasable engagement means against release, and upon the pivoting of the associated hinge to door-closed position being inoperative whereby said frictional releasable engagement means may be released by the simple application of appropriate force.

5. A double-hung door assembly which may be selectively opened from either side or at both sides simultaneously comprising:

a pair of door jambs, and a door suitable for mounting therebetween, whereby each of two opposite sides of said door cooperates with one of said door jambs;

at least one hinge mounted on each side of said door, whereby one end of said hinge is secured to the door and the other end is adjacent the cooperating one of said door jambs and is free for swinging movement; and,     at least one latch mechanism mounted partly on the free end of each hinge and partly on the corresponding door jamb at each of said opposite sides, said latch mechanism comprising         frictional releasable engagement means adapted at times to join said hinge to said door jamb and at times not to join said hinge to said door jamb,     releasable positive-catch means mounted in operative relationship with each hinge and associated frictional releasable engagement means,         the releasable positive-catch means upon the pivoting of the associated hinge to door-open position being operative positively to secure the associated frictional releasable engagement means against release, and upon the pivoting of the associated hinge to door-closed position being inoperative whereby said frictional releasable engagement means may be released by the simple application of appropriate force.

6. An assembly of a first member, a second member and associated hinge-and-latch mechanism in combination, and comprising:

at least one hinge having one side thereof secured to either said first member of said second member and having the second side thereof detachably securable to the other of said first and second members;

at least one frictional latch mechanism for detachably securing the second side of said hinge to the other of said first and second members and comprising         a generally hollow bushing having a slot therein and mounted upon a mounting plate, said mounting plate being connected to either said first member or said second member,         a resilient member in said slot,         pin means,             said pin means being connected to the one of said first and second members to which said mounting plate is not connected, and being adapted to fit into said bushing to become frictionally engaged by said resilient member whereupon said first member is pivotally joined to said second member by said hinge,             and said pin means being adapted to be readily released from said bushing and resilient member upon simple force application without the aid of a release mechanism whereupon said first member is released from said second member; and         a releasable positive-catch means adapted to permit freedom of removal of said pin means from said bushing by simple force when said first member is in one position relative to said second member, and adapted to secure said pin means in said bushing when said first member is in other positions relative to said second member.

7. An assembly according to claim 6 wherein said releasable positive-catch means comprises:

a lock means resiliently urged into engagement with one of said first and second members and adapted for movement in response to relative movement between said first and second members into two operative alternative positions,     said lock means in one of said positions having no engagement with said pin means or parts non-releasably secured thereto, and     said lock means in the second of said positions engaging said pin means or parts non-releasably secured thereto by which positively to secure said pin means in said bushing.

8. An assembly according to claim 6 wherein said mounting plate is said hinge.

9. An assembly according to claim 7 wherein said bushing is mounted in a housing which is secured to said mounting plate, and said lock means rides in said housing.

10. An assembly according to claim 6 wherein said releasable positive-catch means comprises a recess portion in said pin means and a lock pin for engagement in said recess portion to form a positive-catch.

11. An assembly according to claim 6 wherein said releasable positive-catch means comprises:

a lock pin resiliently urged into engagement with one of said first and second members and adapted for movement in response to relative movement between said first and second members into two operative alternative positions, and     a lock clip secured to said pin means,     said lock pin in one of said positions having no engagement with said lock clip, and     said lock pin in the second of said positions engaging said lock clip thereby positively to secure said pin means in said bushing.

12. An assembly of a first member and a second member movable relative to each other and at least two associated hinge-and-latch mechanisms in combination, and comprising:

at least one hinge on each of two sides of said first member,         each hinge having one end thereof secured to either said first member or said second member and having the second end thereof detachably secured to the other of said first and second members;

at least one frictional releasable engagement means securing the second end of each hinge to the other of said first and second members,         whereby a force on one side of said first member releases said frictional releasable engagement means associated with one of said hinges and causes said first member to pivot about the other of said hinges,         and whereby a force on said first member effective equally on both of said frictional releasable engagement means causes both to release thereby separating said first and second members; and     a releasable positive-catch means associated with each frictional releasable engagement means         said releasable positive-catch means being ineffective when said first and second members are in one position relative to each other whereby said frictional releasable engagement means may be released without operation of a release mechanism;

but when said first and second members are in other positions relative to each other said releasable positive-catch means being effective positively to secure said first and second members together through the associated hinge.

13. An assembly of a first member, a second member and associated hinge-and-latch mechanism in combination, comprising:

at least one hinge having two sides, one of which sides is secured to either said first or second member;

a latch mechanism associated with said hinge and including frictional releasable engagement means mounted partly on the other one of said first and second members and partly on said hinge,         said latch mechanism being adapted at times to join said first and second members and at times not to join said first and second members;

said frictional releasable engagement means comprising a female member of hollow form and a male member adapted to be engaged in the hollow of said female member thereby to join said first and second members;

and a releasable positive-catch means operaitve during one positional relationship between said first and second members to prevent release of the male member from the female member, said releasable positive-catch means during other positional relationship between said first and second members being inoperative whereby a force tending to part said first and second members releases the male member from the female member without need for operation of a release mechanism.

14. A hinge-and-latch mechanism comprising:
a hinge having a first side thereof secured to a door jamb;
a male member mounted on a door;
resilient detent means mounted up a second side of said hinge,
said resilient detent means comprising a bushing with an opening therein for receipt of said male member and with a slot in the side thereof, and a resilient means in said slot adapted to frictionally engage said male member,
said bushing having an abutment means adapted to restrict movement of said bushing in one direction relative to said hinge side and an additional abutment means adapted to restrict movement of said bushing in the other direction relative to said hinge side,
one of said abutment means being said resilient means, lock means responsive to the normal door-closed and door-open angular positions of said hinge sides,
said lock means being operative when said hinge sides are in the normal door-open position for positively securing said male member in the position wherein it is engaged by said resilient detent means and
said lock means being rendered inoperative when said hinge sides are in the normal door-closed position whereby said male member is readily released from said resilient detent means simply upon the application of appropriate force,
said lock means being resiliently urged toward the position wherein it is operative for positively securing said male member, and being yieldable to a proximate door jamb into the position wherein it is inoperative.

15. A latch mechanism releasably securing a first member to a second member and comprising in combination
a pin means secured to said first member, said pin means including engaging means thereon for coperating with a detent means;
a bushing-and-mount assembly secured to said second member for releasably receiving said pin means, said bushing-and-mount assembly including
a mounting plate secured to said second member and having an opening therein, a bushing means having a hollow therein for receiving said pin means in said hollow, and having an opening in the side thereof, said bushing means being positioned in the opening in said mounting plate and having an abutment means adapted to restrict movement of said bushing in one direction relative to said mounting plate and an additional abutment means adapted to restrict movement of said bushing means in the other direction relative to said mounting plate,
one of said abutment means being a spring means positioned in said opening in the side of the bushing which spring means functions both to hold the bushing-and-mount assembly together and also as a resilient detent means for releasably engaging said engaging means of said pin means when said pin means is in said hollow.

16. The latch mechanism defined in claim 15 wherein said engaging means comprises an annular groove on said pin means generally concentric with the longitudinal axis.

17. A latch mechanism in accordance with claim 15 wherein said second member includes a recessed portion of a size suitable for receiving at least the major portion of said bushing, and said bushing is mounted in said recessed portion.

18. A latch mechanism releasably securing a first member to a second member comprising:
a pin secured to said first member, said pin including engaging means for cooperation with a resilient member;
a bushing assembly secured to said second member, said bushing assembly being mounted on a mounting plate and including
a bushing having a hollow portion for receipt of said pin, and
a slot extending through one side of said bushing for receiving a resilient member;
a resilient member positioned in said slot for frictional holding-engagement with the engaging means of said pin when said pin is in said hollow portion; and,
at least one annular spacer adapted for positioning around said bushing on either side of said mounting plate to thereby permit easy adjustment of bushing position along the line of pin movement;
whereby said pin may be readily inserted into said bushing to thereby become frictionally engaged by said resilient member, and may be readily released from said bushing and resilient member.

References Cited

UNITED STATES PATENTS

| 1,973,410 | 9/1934 | Greibach | 339—262 XR |
| 2,738,543 | 3/1956 | Van Meter | 16—147 |
| 2,790,992 | 5/1957 | Campbell | 16—147 XR |
| 2,859,470 | 11/1958 | McClung | 16—147 |

KENNETH DOWNEY, Primary Examiner.

U.S. Cl. X.R.

16—147, 175; 292—103, 147

UNITED STATES PATENT OFFICE
CERTIFICATE OF CORRECTION

Patent No. 3,436,860                                                                 April 8, 1969

Fred W. James

It is certified that error appears in the above identified patent and that said Letters Patent are hereby corrected as shown below:

Column 3, line 27, "many" should read -- may --. Column 5, line 14, "D-ring" should read -- D-spring --. Column 6, lines 19 and 20, "tion of upper attached thereto forwardly of the heel area, ment" should read -- no counter sinking of the door 64, and in this embodiment --; line 43, beginning with "socket," cancel all to and including "material" in line 46; line 61, "about" should read -- abut --. Column 7, line 59, after "example," insert -- if --; line 75, "tin" should read -- in --. Column 8, line 10, after "per-" insert -- pendicular to the longitudinal axis of the bushing. In the --; line 13, "witah" should read -- with --; line 43, after line 43, insert -- -o-O-o-

(SEAL)                 Signed and sealed this 7th day of April 1970.

Attest:

Edward M. Fletcher, Jr.                                       WILLIAM E. SCHUYLER, JR.
Attesting Officer                                                     Commissioner of Patents